Patented Dec. 10, 1940

2,224,807

UNITED STATES PATENT OFFICE 2,224,807

GLUCOSIDES OF POLYHYDROXY-FLAVONES AND POLYHYDROXY-FLAVANONES

Max Bockmühl, Frankfort-on-the-Main-Hochst, and Erich Bartholomäus, Wiesbaden-Biebrich, Germany, assignors to Winthrop Chemical Company, Inc., New York, N. Y., a corporation of New York No Drawing. Application December 17, 1937, Serial No. 180,320. In Germany December 24, 1936

8 Claims. (Cl. 260—210)

The present invention relates to compounds having the character of glucosides and to a process of preparing them, more particularly to glucosides from polyhydroxy-flavones and polyhydroxy-flavanones.

As is known, glucosides of polyhydroxy-flavones or polyhydroxy-flavanones are of interest owing to their physiological action. Such compounds were hitherto obtained from fruits. Now we have found that active glucosides and glucoside-like compounds of polyhydroxy-flavones and polyhydroxy-flavanones may be made by transforming into the corresponding glucosides, the synthetically accessible polyhydroxy-flavones, polyhydroxy-flavanones, or the partially etherified derivatives of these compounds.

The process may be carried out by causing alkali salts of the said flavones or flavanones to react with an acetohalogenose, for instance with acetobromo-glucose, and splitting off the acetyl groups from the resultant acetyl-glucosides by means of agents having an alkaline action, for instance, caustic soda solution or ammonia. With the same result the glucosides and glucoside-like compounds are obtained by condensing the said flavones or flavanones with acetyl-glucose. A sugar residue may be introduced once or several times. The process may also be carried out by glucosidifying at the hydroxyl groups the intermediate products obtained in the synthesis of hydroxyflavones or hydroxy-flavanones and transforming the compounds obtained into the corresponding flavones or flavanones.

The following examples serve to illustrate the invention but they are not intended to limit it thereto; the parts being by weight if not stated otherwise:

(1) 4'-methoxy-7-hydroxy-flavone-tetraacetyl-glucoside

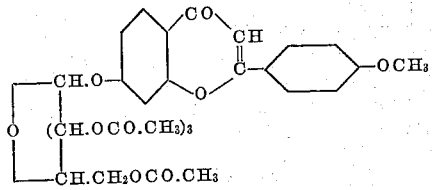

19.8 parts of 4'-methoxy-7-hydroxy-flavone are dissolved in 75 parts by volume of N-caustic soda solution, a solution of 31 parts of acetobromo-glucose in 200 parts by volume of acetone is added and the whole is allowed to stand overnight. The following morning the crystallized starting material is filtered with suction and the filtrate is diluted with water. The precipitate which at first has a smeary consistency gradually becomes solid and is filtered with suction, washed with water and dried.

This crude product is dissolved in chloroform, the solution is filtered, evaporated and the residue is redissolved from alcohol. The tetraacetyl-glucoside thus obtained forms feebly yellowish needles melting between 186° C. and 188° C.

(2) 4'-methoxy-7-hydroxy-flavone-glucoside

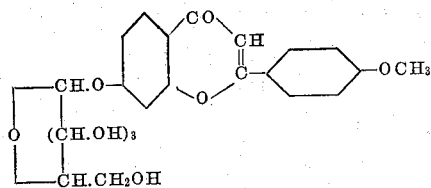

60 parts of 4'-methoxy-7-hydroxy-flavone-tetraacetyl-glucoside are stirred into a paste with 1800 parts by volume of methanol and 60 parts of concentrated caustic potash solution are gradually added while stirring. After stirring for several hours water is added and the whole is filtered with suction. The crude product obtained is redissolved from pyridine and methanol and feebly greenish-yellow, small needles melting between 251° C. and 252° C. are obtained.

(3) Galangin-glucoside

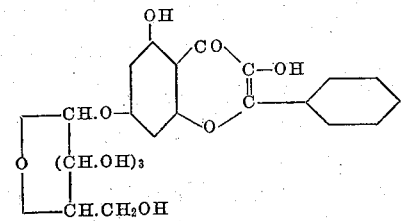

300 parts by volume of acetone, 245 parts by volume of N-caustic soda solution and a solution of 100.8 parts of acetobromo-glucose in 360 parts by volume of acetone are added to 32.4 parts of galangin. The precipitate which at first forms gradually passes into solution. After 5 to 6 hours the solution is acidified by means of acetic acid, introduced into ethyl acetate and shaken out with water. The residue obtained by evaporating this ethyl acetate solution is dissolved in 500 parts by volume of methanol and 175 parts of concentrated caustic soda solution are added, while cooling. The crude glucoside is obtained by acidifying with acetic acid and distilling off the methanol. After redissolving the crude glucoside several times from dilute methanol it forms yellowish, fine needles melting between 252° C. and 253° C. Fehling solution is only reduced after it has been split by hydrochloric acid.

(4) *Eriodictyol-tetraacetyl-glucoside*

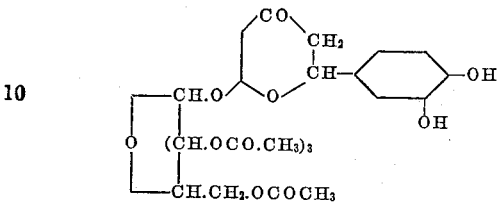

92 parts of eriodictyol are dissolved in a nitrogen atmosphere in 1000 parts by volume of acetone and 320 parts by volume of N-caustic soda solution. A solution of 140 parts of acetobromo-glucose in 560 parts by volume of acetone and 320 parts by volume of N-caustic soda solution are gradually added at the same time, while stirring. After 5 to 6 hours the whole is acidified by means of acetic acid, introduced into ethyl acetate, agitated with water and then with a solution of sodium bicarbonate and the ethyl acetate solution is dried. The solution is treated with charcoal and evaporated, the residue is dissolved in chloroform, the unchanged eriodictyol remaining undissolved, and the solution is introduced into gasoline. The tetraacetyl-glucoside thus obtained is a feebly yellow, crystalline powder readily soluble in alcohol.

(5) *Eriodictyol-glucoside*

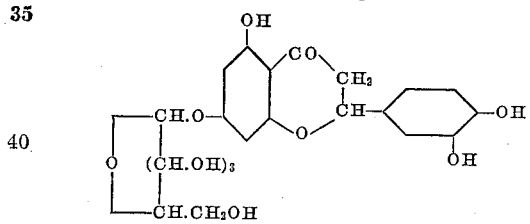

49.4 parts of the above tetraacetyl compound are dissolved in a nitrogen atmosphere in 1500 parts by volume of N-caustic soda solution; after 2 hours 1500 parts by volume of N-sulfuric acid are added, the whole is treated with charcoal and evaporated under reduced pressure. The residue obtained is extracted by means of methanol and the solution is again evaporated. The extraction residue obtained is dissolved in a small quantity of absolute alcohol, acetone is added, the solution is clarified by charcoal and precipitated by means of ether.

The yellow glucoside obtained readily dissolved in water and alcohol.

We claim:
1. The process which comprises causing an acetohalogenose to act upon an alkali salt of a compound selected from the group consisting of polyhydroxyflavones, polyhydroxyflavanones and the partly etherified derivatives of these compounds.
2. The process which comprises causing an acetohalogenose to act upon an alkali salt of a compound selected from the group consisting of polyhydroxyflavones, polyhydroxyflavanones and the partly etherified derivatives of these compounds and saponifying the acetyl group of the acetyl compounds thus obtained.
3. The process which comprises causing acetobromo-glucose to act upon an alkali salt of a compound selected from the group consisting of polyhydroxyflavones, polyhydroxyflavanones and the partly etherified derivatives of these compounds.
4. The process which comprises causing acetobromo-glucose to act upon an alkali salt of a compound selected from the group consisting of polyhydroxyflavones, polyhydroxyflavanones and the partly etherified derivatives of these compounds and saponifying the acetyl group of the acetyl compounds thus obtained.
5. The process which comprises causing acetobromo-glucose to act upon eriodictyol dissolved in a mixture of acetone and caustic soda solution, acidifying the solution with acetic acid, pouring the solution into ethyl acetate, agitating it with water, evaporating the ethyl acetate solution, dissolving the residue with chloroform, pouring the solution into gasoline and isolating the precipitate.
6. The process which comprises causing acetobromo-glucose to act upon eriodictyol dissolved in a mixture of acetone and caustic soda solution, acidifying the solution with acetic acid, pouring the solution into ethyl acetate, agitating it with water, evaporating the ethyl acetate solution, dissolving the residue with chloroform, pouring the solution into gasoline, isolating the precipitate and saponifying the tetraacetyl compound thus obtained by means of an alkaline reagent.
7. The process which comprises causing acetobromo-glucose to act upon eriodictyol dissolved in a mixture of acetone and caustic soda solution, acidifying the solution with acetic acid, pouring the solution into ethyl acetate, agitating it with water, evaporating the ethyl acetate solution, dissolving the residue with chloroform, pouring the solution into gasoline, isolating the precipitate, dissolving the isolated compound in caustic soda solution, adding the equivalent amount of sulfuric acid to the solution, evaporating the solution under reduced pressure, extracting the residue with methanol, evaporating the extract, dissolving the residue in alcohol, precipitating with ether and isolating the residue.
8. The compounds of the following general formula

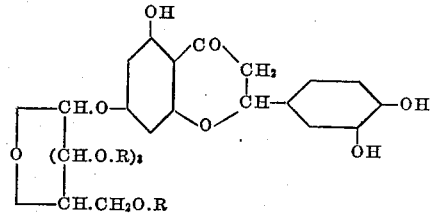

wherein R stands for a member of the group consisting of hydrogen and —COCH₃, said compounds being yellow crystalline powders readily soluble in alcohol.

MAX BOCKMÜHL.
ERICH BARTHOLOMÄUS